(12) United States Patent
Ghobrial et al.

(10) Patent No.: US 7,142,533 B2
(45) Date of Patent: Nov. 28, 2006

(54) ECHO CANCELLER AND COMPRESSION OPERATORS CASCADED IN TIME DIVISION MULTIPLEX VOICE COMMUNICATION PATH OF INTEGRATED ACCESS DEVICE FOR DECREASING LATENCY AND PROCESSOR OVERHEAD

(75) Inventors: Ayman Ghobrial, Huntsville, AL (US); Jerry Lynn Greer, Huntsville, AL (US); Bruce Edward Mitchell, Madison, AL (US); Paul Graves McElroy, Huntsville, AL (US)

(73) Assignee: Adtran, Inc., Huntsville, AL (US)

( * ) Notice: Subject to any disclaimer, the term of this patent is extended or adjusted under 35 U.S.C. 154(b) by 1030 days.

(21) Appl. No.: 10/095,375

(22) Filed: Mar. 12, 2002

(65) Prior Publication Data

US 2003/0174692 A1 Sep. 18, 2003

(51) Int. Cl.
*H04L 12/28* (2006.01)
*H04L 12/66* (2006.01)
*H04B 3/20* (2006.01)
*H04M 9/08* (2006.01)

(52) U.S. Cl. ............... 370/352; 370/286; 370/401; 379/406.01

(58) Field of Classification Search ........ 370/286–290, 370/352–375, 395–401, 465–474; 379/406.01, 379/406.08, 406.12
See application file for complete search history.

(56) References Cited

U.S. PATENT DOCUMENTS

| | | | |
|---|---|---|---|
| 6,449,269 B1* | 9/2002 | Edholm | 370/352 |
| 6,526,046 B1* | 2/2003 | Carew | 370/352 |
| 6,580,696 B1* | 6/2003 | Chen et al. | 370/286 |
| 6,754,221 B1* | 6/2004 | Whitcher et al. | 370/401 |
| 6,868,116 B1* | 3/2005 | Ahmad | 375/222 |
| 6,879,667 B1* | 4/2005 | Carew et al. | 379/88.17 |
| 2002/0071424 A1* | 6/2002 | Chiu et al. | 370/352 |
| 2003/0174694 A1* | 9/2003 | Mitchell et al. | 370/352 |
| 2003/0206625 A9* | 11/2003 | Ahmad | 379/406.12 |
| 2003/0235198 A1* | 12/2003 | McElroy et al. | 370/395.5 |
| 2003/0235199 A1* | 12/2003 | Herron | 370/395.5 |
| 2003/0235221 A1* | 12/2003 | Gieger et al. | 370/538 |
| 2004/0233902 A1* | 11/2004 | Medhat | 370/375 |

\* cited by examiner

*Primary Examiner*—Man U. Phan
(74) *Attorney, Agent, or Firm*—Allen, Dyer, Doppelt, Milbrath & Gilchrist, P.A.

(57) ABSTRACT

A cascaded signal processing arrangement processes digitally encoded voice samples transported over a time division multiplex (TDM) communication path for application to a processor-controlled digital communication device, in particular an integrated access device. Processed voice samples are packetized in accordance with an encapsulating protocol and transmitted as a packetized voice output stream to a destination receiver device. The arrangement includes an echo canceller coupled to the TDM communication path and performing echo cancellation processing on the digitally encoded voice samples. The echo cancellation-processed voice sample signals are compressed by a data compression operator and applied to a packet encapsulating host processor via the TDM communication path. This obviates the necessity of the host processor having to use data bus cycles to download processed digitized voice samples.

16 Claims, 2 Drawing Sheets

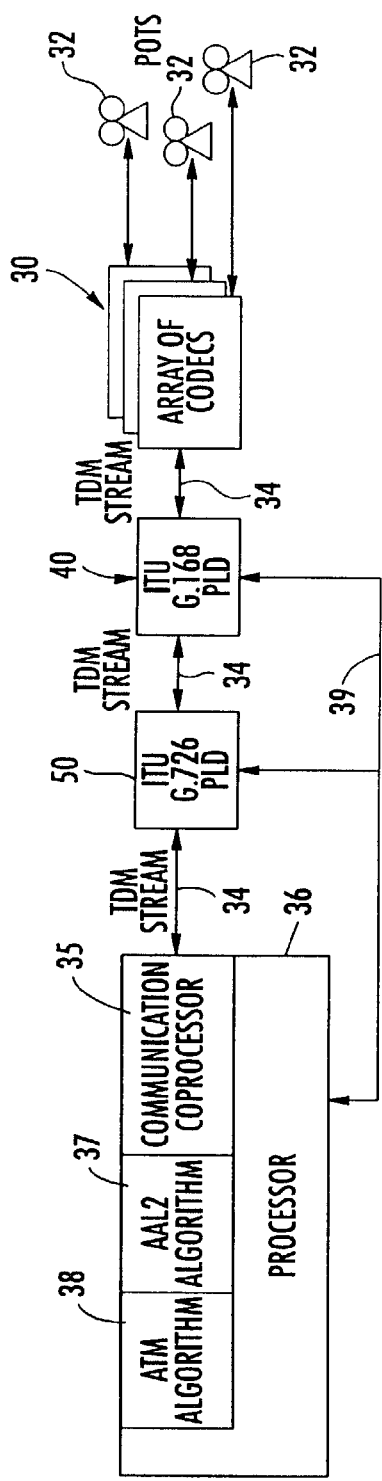

ECHO CANCELLER AND COMPRESSION OPERATORS CASCADED IN TIME DIVISION MULTIPLEX VOICE COMMUNICATION PATH OF INTEGRATED ACCESS DEVICE FOR DECREASING LATENCY AND PROCESSOR OVERHEAD

FIELD OF THE INVENTION

The present invention relates in general to communication systems and subsystems therefor, and is particularly directed to a time division multiplexed (TDM) transport path-cascaded echo canceller and compression arrangement for use with an integrated access device (IAD), which operates directly on a TDM encoded voice stream to produce a processed digitized voice signal stream, so as to avoid burdening the host processor with having to use data bus cycles to extract the processed digitized voice samples.

BACKGROUND OF THE INVENTION

The ability to conduct high-speed data communications between relatively remote data processing systems and associated subsystems is currently a principal requirement of a variety of industries and applications, such as business, educational, medical, financial and personal computer users. Moreover, it can be expected that present and future applications of such communications will continue to engender more such systems and services. One technology that has attracted particular interest in the telecommunication community is digital subscriber line (DSL) service. DSL technology enables a public switched telephone network (PSTN) to use existing telephone copper wiring infrastructure to deliver a relatively high data bandwidth digital communication service, that is selected in accordance with expected data transmission rate, the type and length of data transport medium, and schemes for encoding and decoding data.

FIG. 1 is a reduced complexity diagram of the general architecture of a DSL system, having a pair of mutually compatible digital communication transceivers 1 and 3 installed at remotely separated 'west' and 'east' sites 2 and 4, respectively, and coupled to a communication link 10, such as a twisted pair of an existing copper plant. One of these transceivers, for example, the west site transceiver 1, may be installed in a digital subscriber line access multiplexer (DSLAM) 6 of a network controller site (such as a telephone company central office (CO)). The DSLAM is coupled with an associated network backbone 5 that provides access to a number of information sources 7 and the Internet 8. As such, the west site transceiver 1 is used for the transport of digital communication signals, such as asynchronous transfer mode (ATM)-based packetized voice and data, from the west central office site 2 over the communication link 10 to an integrated access device (IAD) serving as the DSL transceiver 3 at the east end of the link, and may be coupled with a computer 9 at a customer premises, such as a home or office.

An integrated access device (IAD) is used to consolidate digitized data, voice and video traffic over a common wide area network (WAN) DSL link. The digitized voice stream may be digitally encoded as mu-law or a-law voice samples, such as supplied by an industry standard ITU G.711 codec, or it may comprise digitally encoded voice samples from an integrated services digital network (ISDN) phone. When these digitally encoded voice samples are encapsulated in accordance with packet or cell protocol for transport over the network (for example, using voice over asynchronous transfer mode (ATM) or voice over internet protocol (IP)), it is often desirable to incorporate into the IAD both echo cancellation and compression processing, in an effort to both optimize the signal quality and to maximize the bandwidth available for non-voice signaling. Commonly used industry standard signal processing operators for this purpose include ITU G.168 echo cancellation and ITU G.726 adaptive differential pulse code modulation (ADPCM) compression.

Now although these signal processing operators are available commercially as off-the-shelf components, they are usually based around a relatively costly digital signal processor (DSP) that occupies a substantial amount of circuit board real estate and consumes a large amount of power. However, the most undesirable attribute of such DSP-based operators is the fact that the downstream host processor, to which the data produced by the echo cancellation and compression engines of the DSP array is to be delivered, is burdened with the responsibility for performing data bus cycles in order to read the data.

This conventional architecture is diagrammatically shown in FIG. 2, wherein an array of dedicated DSPs 20 have their inputs derived from an incoming TDM stream 22, such as may be supplied by an array of codecs 24 which output digitized voice samples in accordance with voice signals supplied thereto from upstream POTS phones 26. The (compression and echo cancellation) processed data produced by the DSP array 20 is coupled over an associated parallel data bus structure 28 to a downstream host processor 25 for assembly into packets in accordance with an encapsulating protocol. The packets are then output over a digital communication link as a packetized voice output stream to a destination receiver device. Because the host processor must execute data bus cycles to read the digitized voice sample data produced by the DSP array, it suffers a relatively large performance burden which increases the latency of the system.

SUMMARY OF THE INVENTION

In accordance with the present invention, this problem is successfully resolved by installing respective TDM transport path-cascaded echo canceller and compression operators directly in the TDM link, each inserted unit operating directly on respective channels of an input TDM encoded voice stream to produce a processed digitized voice TDM signal stream. The resulting TDM stream is then coupled over the TDM link to a communication co-processor within a downstream host processor. In a preferred embodiment, each signal processing engine is implemented as a respective field programmable gate array that executes a conventional signal processing algorithm, such as the ITU G.168 echo cancellation and ITU G.726 ADPCM compression operators, referenced above. For different ADPCM compression rates, the data may be encoded differently into the eight-bit TDM stream.

The respective gate arrays are interfaced with the TDM bus on their upstream and downstream ends by way of two full TDM ports, which may be configured as conventional serial-to-parallel and parallel-to-serial conversion and associated signal encoding format (e.g., mu-law) circuits. This allows each of the echo cancellation and compression operators to operate directly on the data transported by any channel of the TDM voice sample signal stream, and produces processed digitized voice signal data that is then placed back in the same channel of the TDM stream for transport directly to the host processor's communication co-processor. This avoids burdening the host processor with having to use data bus cycles to extract the data, as in the DSP array based architecture of FIG. 2.

BRIEF DESCRIPTION OF THE DRAWINGS

FIG. 3 diagrammatically illustrates a TDM transport path-cascaded echo canceller and compression arrangement in accordance with the present invention; and FIGS. 4 and 5 show TDM port connections for the echo canceller and ADPCM compression-decompression gate arrays of FIG. 3.

DETAILED DESCRIPTION

Figure 1:
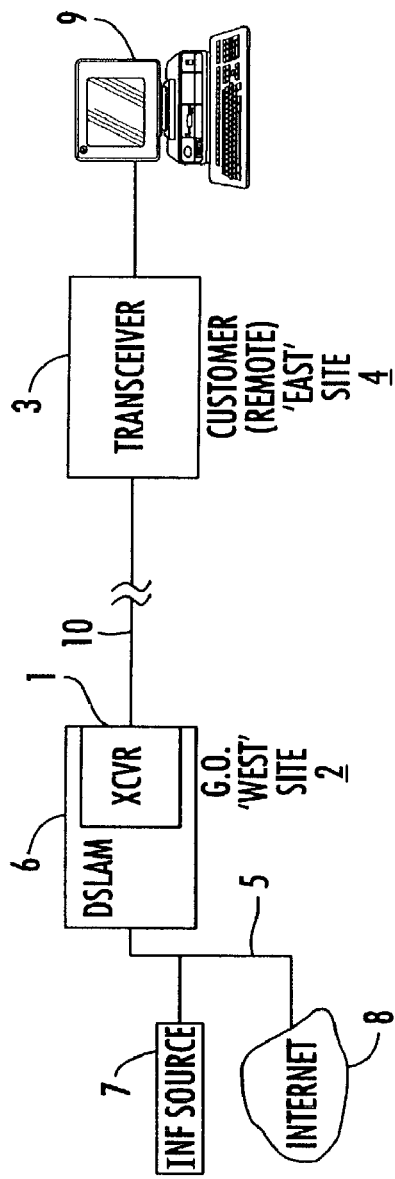
FIG. 1 is a reduced complexity diagram of the general architecture of a DSL telecommunication system.

Before detailing the TDM transport path-cascaded echo canceller and compression arrangement of the present invention, it should be observed that the invention resides primarily in a prescribed arrangement of conventional communication hardware components and attendant supervisory communications microprocessor circuitry and application software therefor, that controls the operations of such components. In a practical implementation that facilitates its incorporation into telecommunication transceiver equipment (such as that which may be installed at a customer premises-associated integrated access device), the invention may be readily implemented using field programmable gate array (FPGA) or application-specific integrated circuit (ASIC) chip sets. In terms of a practical hardware implementation of such chip sets, digital ASICs are preferred.

Consequently, the configuration of such subsystems and components and the manner in which they may be interfaced with a telecommunication wireline pair have been illustrated in the drawings by readily understandable block diagrams, which show only those specific details pertinent to the present invention, so as not to obscure the disclosure with details that will be readily apparent to those skilled in the art having the benefit of the description herein. Thus, the block diagrams of the Figures are primarily intended to show the major components in convenient functional groupings, so that the present invention may be more readily understood.

Figure 2:
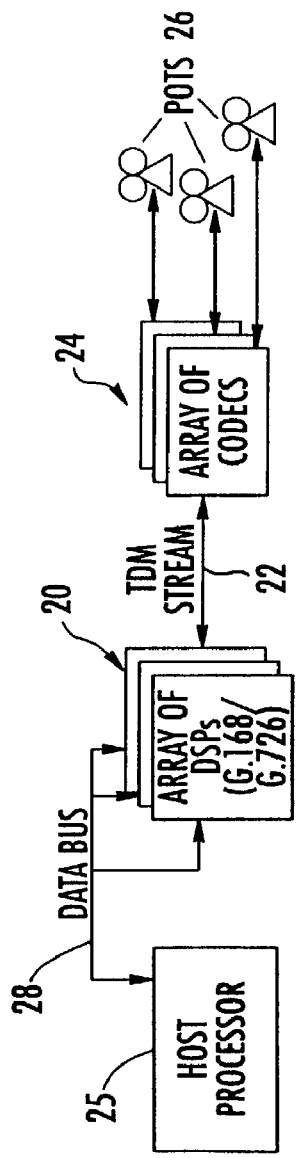
FIG. 2 diagrammatically illustrates a conventional DSP array-based echo cancellation and compression mechanism for processing digitally encoded voice samples transported over a packetized voice communication network.

Attention is now directed to FIG. 3, which diagrammatically illustrates an embodiment of the TDM transport path-cascaded echo canceller and compression arrangement of the present invention. In particular, like the voice sample signal processing architecture of FIG. 2, FIG. 3 shows an array of codecs 30 coupled to associated POTS phones 32, and being operative to output respective digitally encoded voice signals as part of a time division multiplexed stream over a serial communication link 34. As a non-limiting example, the format of the digitized TDM data may have a code width of eight bits (byte-encoded data).

As pointed out above, rather than terminate the serial communication link 34 at a DSP array as in the arrangement of FIG. 2, the present invention cascades respective echo cancellation and compression engines 40 and 50 within the TDM transport path 34 and then outputs the processed voice sample data produced by the cascaded signal processing operators in TDM format for application to a communication co-processor 35 within a downstream host processor 36. The host processor 35 assembles the incoming processed voice sample data into packets in accordance with an encapsulating protocol, and then outputs the packetized voice signal stream over a digital communication link to a destination receiver device.

As a non-limiting example, in the case of ATM-based voice over data transmissions, the processed voice sample data may be encapsulated in accordance with respective algorithms 37 and 38 to produce a four byte AAL2 header and a four byte ATM header. A control bus 39 is coupled between the host processor 35 and each of the signal processing engines for supervisory control communications, such as for establishing operational parameters, as in a conventional communication signal processing application. However, it is not used for data transport, which is coupled by way of the TDM link.

In accordance with a preferred, but non-limiting embodiment, the processed voice sample data received by the communication co-processor 35 from the TDM link 34 may be encapsulated using a direct memory access (DMA)-based packet generation mechanism of the type described in co-pending U.S. patent application Ser. No. 10/095,380, filed coincident herewith by B. Mitchell et al, entitled: "Mechanism for Utilizing Voice Path DMA in Packetized Voice Communication System to Decrease Latency and Processor Overhead," assigned to the assignee of the present application and the disclosure of which is incorporated herein.

As described in that application, when encoded voice sample data is received from the TDM link, it is written directly into prescribed sub-portions of a preallocated portion of random access memory, so as to avoid interrupting the host processor core. A pointer to a respective buffer space sub-portion is presented to a protocol stack, so that one or more overhead bytes for the stored voice samples can be generated and written into adjacent address space of the preallocated portion of random access memory. The contents of the preallocated memory space are then serialized out for transmission to a destination receiver. In the case of an ATM cell used for voice over data transmissions, the overhead bytes may include a four byte AAL2 header and a four byte ATM header, as produced by the respective AAL2 and ATM algorithms 37 and 38.

As these auxiliary bytes are generated, they are written into a second prescribed sub-portion of the random access memory preallocated to the n number of (forty-four) digitally encoded voice samples. In addition, a 'ready-to-transmit' flag is asserted, so that the processor can immediately read out the composite cell (headers plus voice sample data) for transmission. For the case of a fifty-three byte ATM cell, the serializing mechanism of the transmitter prepends a header error check or HEC byte to complete the fifty-three byte cell, as the fifty-two bytes (four ATM header, four AAL2 header, and forty-four voice) are serialized out from memory for transmission to a destination receiver.

The echo cancellation and compression engines 40 and 50 installed in the TDM link 34 may be implemented as respective field programmable gate arrays that execute conventional signal processing algorithms, such as the ITU G.168 echo cancellation and ITU G.726 adaptive differential pulse code modulation (ADPCM) compression operators, referenced above. For different ADPCM compression rates, the data may be encoded differently into the eight-bit TDM stream. As a non-limiting example, for 40 KB data, the upper five (most significant) bits may be used; for 32 KB data, bits four through seven may be used; for 24 KB data, bits four through six are employed; for 16 KB data, the compressed data is encoded in bits four and five. Unused bits are packed with zeros.

As shown in FIGS. 4 and 5, respective gate arrays 40 and 50 are interfaced with the TDM bus 34 on their input (upstream) and output (downstream) ends by way of two full TDM ports 41/42 and 51/52. In a non-limiting but preferred embodiment these ports are configured as serial-to-parallel and parallel-to-serial conversion and associated signal encoding format (e.g., mu-law) circuits of the type conventionally employed in the art for the purpose. This allows each of the echo cancellation and compression operators to operate directly on the data transported by any channel of the TDM voice sample signal stream, and produces processed digitized voice signal data that is then placed back in the same channel of the TDM stream for transport directly to the communication co-processor 35. As pointed out above, this avoids burdening the host processor 36 with the substantial data interfacing exercise of having to use data bus cycles to extract the data, as in the DSP array based architecture of FIG. 2.

While we have shown and described an embodiment in accordance with the present invention, it is to be understood that the same is not limited thereto but is susceptible to numerous changes and modifications as known to a person skilled in the art, and we therefore do not wish to be limited to the details shown and described herein, but intend to cover all such changes and modifications as are obvious to one of ordinary skill in the art.

What is claimed is:

1. For use with a processor-controlled digital communication device adapted to process digitally encoded voice samples transported over a time division multiplex (TDM) communication path for assembly in accordance with a communication protocol, so that said voice samples may be transmitted over a digital communication link to a destination receiver device, a method of processing said digitally encoded voice samples for delivery to said processor-controlled digital communication device comprising the steps of:
   (a) performing echo cancellation on said digitally encoded voice samples as received from said TDM communication path, and transporting echo cancellation-processed voice sample signals over said TDM communication path to downstream processing;
   (b) performing compression of said echo cancellation-processed voice sample signals as received from said TDM communication path from step (a) and transporting compressed, echo cancellation-processed voice sample signals over said TDM communication path to a downstream host processor of said processor-controlled digital communication device; and
   (c) coupling said compressed, echo cancellation-processed voice sample signals as transported to said TDM communication path in step (b) to said host processor of said processor-controlled digital communication device for assembly into a voice output stream in accordance with said communication protocol.

2. The method according to claim 1, wherein said processor-controlled digital communication device comprises an integrated access device.

3. The method according to claim 1, wherein step (a) comprises performing ITU G.168 echo cancellation on said digitally encoded voice samples received from said TDM communication path.

4. The method according to claim 1, wherein step (b) comprises performing ITU G.726 adaptive differential pulse code modulation (ADPCM) compression on said echo cancellation-processed voice sample signals as received from said TDM communication path from step (a).

5. The method according to claim 1, wherein said digitally encoded voice samples are encoded as asynchronous transfer mode (ATM) voice packets, and wherein an encapsulating protocol therefor includes an AAL2 header overhead field derived in accordance with a predetermined number of said compressed, echo cancellation-processed voice sample signals, and an ATM header overhead field derived in accordance with said AAL2 header and said predetermined number of said compressed, echo cancellation-processed voice sample signals.

6. The method according to claim 5, wherein said predetermined number of said compressed, echo cancellation-processed voice sample signals corresponds to forty-four digitally encoded and compressed voice sample bytes, and wherein each of said AAL2 and ATM headers is a four byte header, and further comprising prepending a header error check byte to said ATM header overhead field to realize a fifty-three byte ATM voice packet.

7. An arrangement for processing digitally encoded voice samples for delivery to a processor-controlled digital communication device that is adapted to process digitally encoded voice samples transported over a time division multiplex (TDM) communication path for assembly in accordance with a communication protocol, so that said voice samples may be transmitted over a digital communication link as to a destination receiver device, said arrangement comprising:
   an echo canceller having a TDM input port coupled to said TDM communication path and being operative to perform echo cancellation processing on said digitally encoded voice samples received from said TDM communication path, and having a TDM output port through which echo cancellation-processed voice sample signals are applied to said TDM communication path for transport downstream; and
   a data compression operator having a TDM input port coupled to said TDM communication path and being operative to perform data compression of said echo cancellation-processed voice sample signals as received from said TDM communication path from said echo canceller, and a TDM output port through which compressed, echo cancellation-processed voice sample signals are applied to said TDM communication path for transport downstream to a host processor of said processor-controlled digital communication device.

8. The arrangement according to claim 7, wherein said processor-controlled digital communication device comprises an integrated access device.

9. The arrangement according to claim 7, wherein said echo canceller is operative to perform ITU G.168 echo cancellation on said digitally encoded voice samples received from said TDM communication path.

10. The arrangement according to claim 7, wherein said compression operator is operative to perform ITU G.726 adaptive differential pulse code modulation (ADPCM) compression on said echo cancellation-processed voice sample signals as received from said TDM communication path.

11. The arrangement according to claim 7, wherein said digitally encoded voice samples are encoded as asynchronous transfer mode (ATM) voice packets, and wherein an encapsulating protocol therefor includes an AAL2 header overhead field derived in accordance with a predetermined number of said compressed, echo cancellation-processed voice sample signals, and an ATM header overhead field derived in accordance with said AAL2 header and said predetermined number of said compressed, echo cancellation-processed voice sample signals.

12. The arrangement according to claim 11, wherein said predetermined number of said compressed, echo cancellation-processor voice sample signals corresponds to forty-four digitally encoded and compressed voice sample bytes, and wherein each of said AAL2 and ATM headers is a four byte header, and wherein said host processor is operative to prepend a header error check byte to said ATM header overhead field to realize a fifty-three byte ATM voice packet.

13. An arrangement for processing digitally encoded voice samples transported over a time division multiplex (TDM) communication path, comprising a TDM signal processor having a TDM input port coupled to said TDM communication path and a TDM output port, and being operative to perform echo cancellation and data compression on digitally encoded voice sample signals received from said TDM communication path, so as to produce compressed, echo cancellation-processed digitally encoded voice sample signals that are applied to said TDM output port for application to said TDM communication path, and wherein said TDM signal processor comprises a TDM communication path-cascaded echo canceller and compression arrangement having an echo canceller cascaded with a data compressor in said TDM communication path, said echo canceller being operative to perform echo cancellation on digitally encoded voice sample signals received from said TDM communication path, said data compressor being operative to perform data compression on echo cancellation-processed digitally encoded voice sample signals received from said echo canceller and to output compressed, echo cancellation-processed digitally encoded voice sample signals that are applied to said TDM output port for application to said TDM communication path.

14. The arrangement according to claim 13, wherein said TDM communication path is coupled to a host processor of a processor-controlled digital communication device that is adapted to process said compressed, echo cancellation-processed digitally encoded voice sample signals for assembly into packets in accordance with an encapsulating protocol, so that said digitally encoded voice sample signals may be transmitted over a digital communication link as a packetized voice output stream to a destination receiver device.

15. The arrangement according to claim 13, wherein said processor-controlled digital communication device comprises an integrated access device.

16. The arrangement according to claim 13, wherein said echo canceller is operative to perform ITU G.168 echo cancellation on digitally encoded voice sample signals received by said TDM input port from said TDM communication path, and wherein said data compressor is operative to perform ITU G.726 adaptive differential pulse code modulation (ADPCM) compression on echo cancellation-processed digitally encoded voice sample signals received via said TDM communication path from said echo canceller and to apply said compressed, echo cancellation-processed digitally encoded voice sample signals via said TDM output port to said TDM communication path.

* * * * *